United States Patent
Matsuyama

(10) Patent No.: US 8,052,205 B2
(45) Date of Patent: Nov. 8, 2011

(54) FLOOR STRUCTURE FOR VEHICLE BODY

(75) Inventor: Shohei Matsuyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 12/640,050

(22) Filed: Dec. 17, 2009

(65) Prior Publication Data

US 2010/0156146 A1 Jun. 24, 2010

(30) Foreign Application Priority Data

Dec. 19, 2008 (JP) .................................. 2008-323430

(51) Int. Cl.
*B62D 25/20* (2006.01)

(52) U.S. Cl. .................................. 296/193.07; 296/204

(58) Field of Classification Search ............. 296/203.01, 296/203.03, 204, 193.07
See application file for complete search history.

(56) References Cited

U.S. PATENT DOCUMENTS

| 4,514,008 | A  | * | 4/1985  | Watanabe et al. | 296/204    |
|-----------|----|---|---------|-----------------|------------|
| 6,382,710 | B1 | * | 5/2002  | Funk et al.     | 296/187.12 |
| 7,644,978 | B2 | * | 1/2010  | Tosaka et al.   | 296/187.12 |
| 2008/0315629 | A1 | * | 12/2008 | Abe et al. | 296/193.07 |
| 2009/0039633 | A1 | * | 2/2009  | Wrinkle et al. | 280/781 |

FOREIGN PATENT DOCUMENTS

| JP | 64-51583    | 3/1989 |
| JP | 08-080874   | 3/1996 |
| JP | 2006-082720 | 3/2006 |
| JP | 2006-213137 | 8/2006 |

* cited by examiner

*Primary Examiner* — Dennis Pedder
(74) *Attorney, Agent, or Firm* — Rankin, Hill & Clark LLP

(57) ABSTRACT

A floor structure for a vehicle body whereby vertical vibration in the floor panel can be minimized. The floor structure for a vehicle body comprises a floor panel having a tunnel part provided laterally centrally of the vehicle body and extending longitudinally of the vehicle body. A ridge is formed in the tunnel part. An inner cross member provided inside the tunnel part and a first cross member on the floor panel are linearly bonded via the ridge.

6 Claims, 9 Drawing Sheets

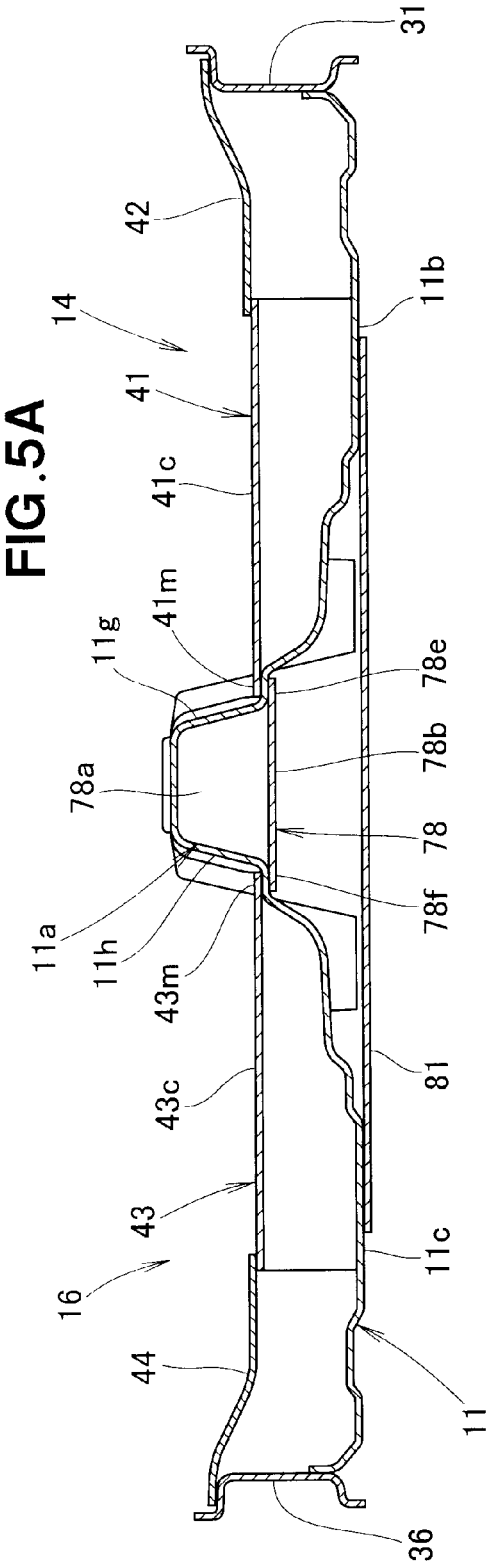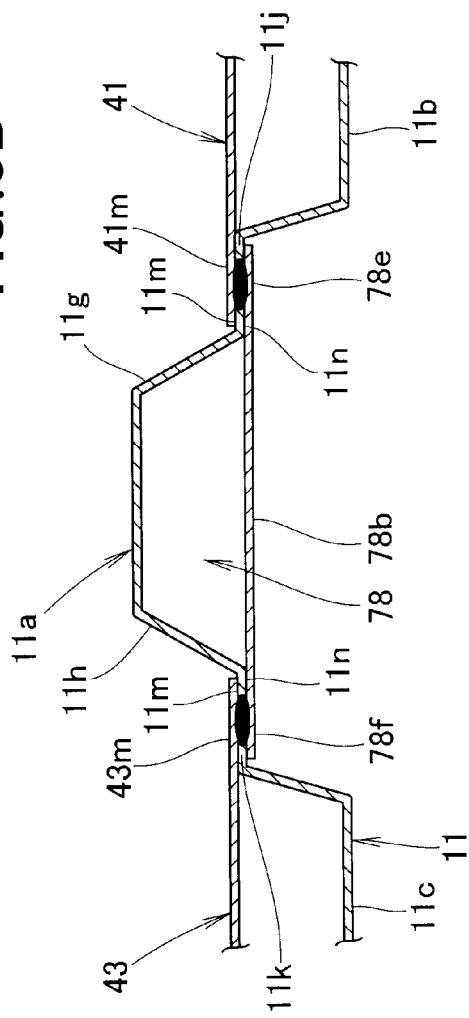

FLOOR STRUCTURE FOR VEHICLE BODY

FIELD OF THE INVENTION

The present invention relates to an improvement in a floor structure for a vehicle body in, e.g., a four-wheeled vehicle.

BACKGROUND OF THE INVENTION

As an example of conventional floor structures for vehicle bodies, a floor structure including a seat bracket extending in a vehicle width direction for mounting a seat above a floor panel is disclosed in, e.g., Japanese Patent Application Laid-Open Publication No. 2006-82720 (JP 2006-82720 A).

FIG. 8 hereof shows the floor structure for a vehicle body disclosed in JP 2006-82720 A.

A floor panel 101 shown in FIG. 8 is comprised of a center tunnel 102 extending in the longitudinal direction through the region disposed centrally with respect to the vehicle width, and floor panel parts 103, 103 provided to the left and right of the center tunnel 102. The rear parts of the floor panel parts 103, 103 are seat-mounting positions 104. At the rear ends of the floor panel parts 103, 103, a kick-up part 106 rising as high as the center tunnel 102 is formed.

Side sills 107, 107 are provided on the external edges of the respective floor panel parts 103, 103; and front seat brackets 111, made to extend in the vehicle width direction and used to mount the front part of the seat, are provided so that both ends thereof are mounted between the side surfaces of the center tunnel 102 and the inside surfaces of the side sills 107, and the bottom surfaces are mounted on the floor panel parts 103. Rear seat brackets 112, made to extend in the vehicle width direction and used to mount the rear part of the seat, are provided so that both ends thereof are mounted between the side surfaces of the center tunnel 102 and the inside surfaces of the side sills 107, the bottom surfaces are mounted to the floor panel parts 103, and the rear surfaces are mounted to the kick-up part 106.

It is difficult to ensure sufficient rigidity in the joined parts, because only the inside ends of the front seat brackets 111 and the rear seat brackets 112 are bonded to the side surfaces of the center tunnel 102. The rigidity of the joined parts will be described with reference to FIGS. 9, 10A and 10B showing a separate but similar floor structure.

Referring to FIG. 9, a floor panel 121 is comprised of a tunnel part 122 and floor bodies 123, 123 formed on the left and right of the tunnel part 122. Side sills 125 extending longitudinally are mounted on the respective outside edges of the floor bodies 123, 123. Front cross members 126 used to mount the front part of the seat and rear cross members 127 used to mount the rear part of the seat are provided so that both ends thereof extend between the side surfaces of the tunnel part 122 and the inside surfaces of the side sills 125, and the bottom parts are mounted to the floor bodies 123.

Reference is made next to FIGS. 10A and 10B showing in cross section the floor structure of FIG. 9.

An internal cross member 128 extending in the vehicle width direction is mounted to the inside surfaces on the inside of the tunnel part 122, as shown in FIG. 10A. A reinforcing member 131 is mounted to the bottom surfaces of the left and right floor bodies 123, 123.

The front cross members 126 are simply bonded to the outside surfaces of the tunnel part 122 as shown in FIG. 10B, and since the internal cross member 128 is merely also simply bonded to the inside surfaces of the tunnel part 122, the bonded portions at the borders between the closed cross sections formed below the front cross members 126 and the closed cross section formed above the internal cross member 128 are fragile parts having low strength and rigidity.

As a result, in FIG. 10A, when the floor panel 121 vibrates vertically along with the vertical vibration of the vehicle body, the floor panel 121 readily undergoes severe vibration so as to bend, as shown by the arrows, relative to the joined parts between the tunnel part 122 and the front cross members 126 and the joined parts between the tunnel part 122 and the internal cross member 128.

SUMMARY OF THE INVENTION

It is therefore an object of the present invention to provide a floor structure for a vehicle body whereby vertical vibration in the floor panel can be minimized.

According to the present invention, there is provided a floor structure for a vehicle body, which structure comprises: a floor panel having a tunnel part provided laterally centrally of the vehicle body and extending longitudinally of the vehicle body; side sills mounted respectively on left and right sides of the floor panel in such a manner as to extend longitudinally of the vehicle body; and a cross member extending over the floor panel laterally of the vehicle body and linking the tunnel part and the side sills, wherein a ridge is formed in the tunnel part, and the cross member and a tunnel-interior cross member provided inside the tunnel part are linearly bonded via the ridge.

For example, when the floor panel vibrates vertically, linearly bonding the tunnel-interior cross member and the cross member on the floor panel reduces the vertical displacement in the floor panel due to tensile force acting via the ridge on the tunnel-interior cross member and the cross member on the floor panel, and bonding the tunnel-interior cross member and the cross member on the floor panel via the ridge creates a three-layer structure and makes it unlikely that bending points will be present in the bonded portion between the ridge and the cross member on the floor panel and in the bonded portion between the ridge and the tunnel-interior cross member. As a result, the floor panel does not readily vibrate vertically, and the ride quality can be improved.

It is preferred that the cross member be bent into a shape that is polygonal in cross-section and has a plurality of weight reduction holes for reducing weight provided in regions bordered by ridge lines formed in the cross member. Since the ridge lines of the cross member primarily ensure rigidity while the weight of the cross member is reduced, the rigidity of the cross member can be ensured even though the weight reduction holes are opened in the regions bordered by the ridge lines.

It is preferred that the cross member have a front wall and a front inclined wall extending upward at a rearward incline from the top edge of the front wall, a seat-mounting hole for mounting a seat be opened in the front inclined wall, and the weight reduction holes be provided in the regions other than the periphery of the seat-mounting hole. For example, during breaking or when the front of the vehicle is involved in a collision, a forward-directed load is transmitted from the seat to the cross member, and the load is primarily supported by the front wall and the seat-mounting hole periphery in the front inclined wall. In other words, a forward-directed load transmitted from the seat to the cross member during breaking or a vehicle collision can be borne by the front wall and the seat-mounting hole periphery in the front inclined wall.

Preferably, the cross member has a region for mounting the front part of the seat.

It is desirable that the front wall of the cross member not have any weight reduction holes.

Desirably, the weight reduction holes are arranged in a staggered pattern.

Preferably, the tunnel-interior cross member has an upward-opening U-shape in cross section.

It is preferable that the cross member have one end inclined upward, the one end being joined to a side sill inner provided so as to extend in the longitudinal direction of the vehicle body along the internal side of a side sill.

In a preferred form, the cross member has a gap formed between a center part thereof and the floor panel so that the center part and the floor panel are not joined together.

BRIEF DESCRIPTION OF THE DRAWINGS

A preferred embodiment of the present invention will be described in detail below, by way of example only, with reference to the accompanying drawings, in which:

FIG. 5A is a cross-sectional view of the vehicle body floor structure, taken along line 5A-5A of FIG. 1 while FIG. 5B is a view showing details of a tunnel part of FIG. 5A;

DETAILED DESCRIPTION OF THE PREFERRED EMBODIMENTS

Figure 1:
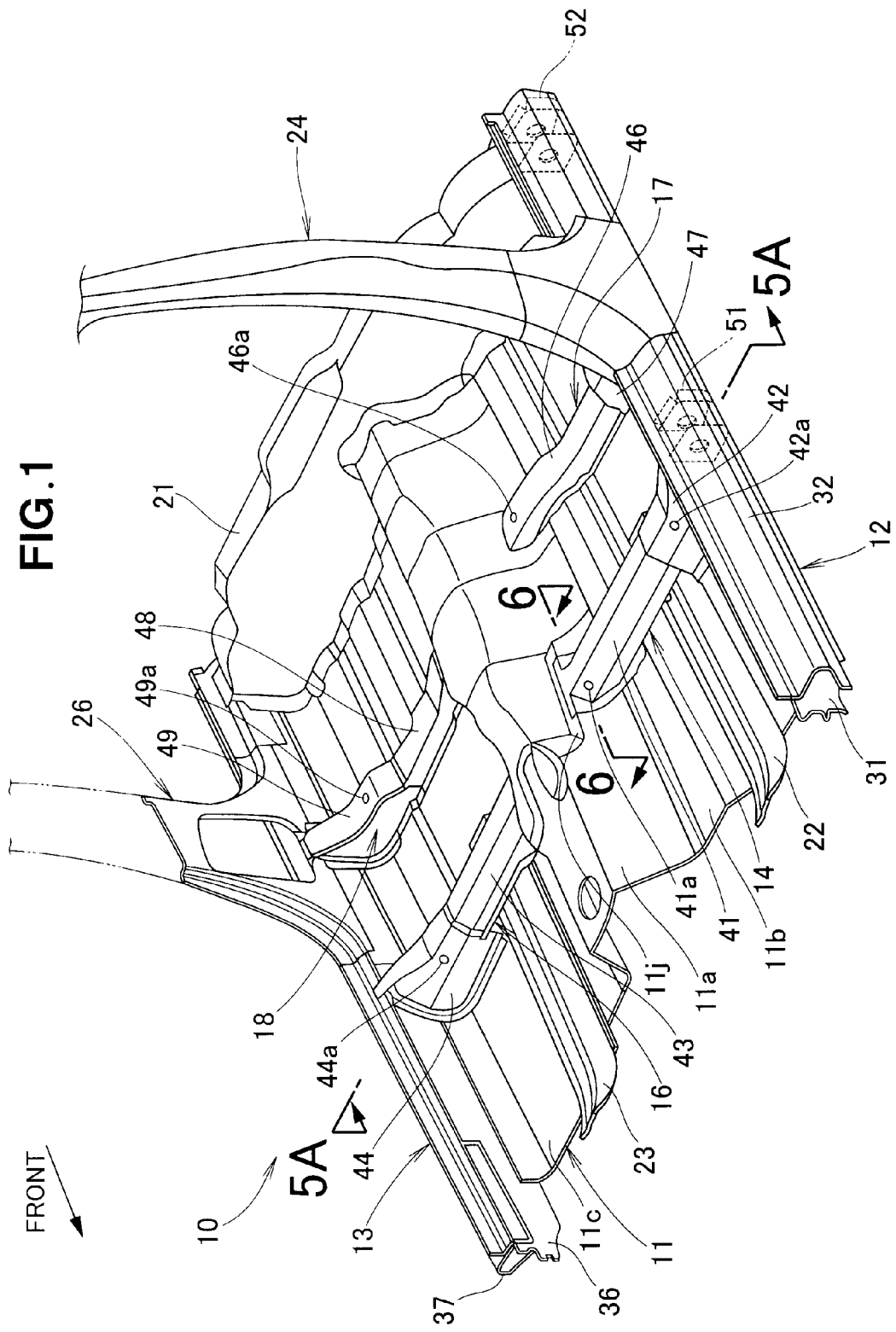
FIG. 1 is a perspective view showing an underbody as a vehicle body floor structure according to the present invention.

Arrow (FRONT) in the drawings indicates a forward direction of an automobile having an underbody (likewise hereinafter).

An underbody 10 shown in FIG. 1 is comprised of a front floor panel 11; left and right side sills 12, 13 mounted on the sides of the front floor panel 11 so as to extend in the longitudinal direction of the vehicle body; a pair of left and right first cross members 14, 16 and a pair of left and right second cross members 17, 18, which extend between the left and right side sills 12, 13 and a tunnel part 11a formed in the vehicle widthwise center of the front floor panel 11 so as to extend in the longitudinal direction of the vehicle body; a middle floor cross member 21 linking the left and right side sills 12, 13 and mounted at the rear end of the front floor panel 11; and left and right front floor members 22, 23 mounted on the top surfaces on both sides of the tunnel part 11a in the front floor panel 11 so as to extend longitudinally. The bottom ends of left and right center pillars 24, 26 are mounted respectively to the left and right side sills 12, 13.

The front floor panel 11 is comprised of the tunnel part 11a, and floor bodies 11b, 11c provided to the left and right of the tunnel part 11a.

The left side sill 12 is comprised of a left side sill inner 31 mounted to the front floor panel 11, a side sill reinforcing member 32 mounted to the side sill inner 31, and a side sill outer (not shown) mounted to the external side of the side sill reinforcing member 32. The left center pillar 24 is mounted to the left side sill inner 31 and the side sill outer.

Similarly, the right side sill 13 is comprised of a right side sill inner 36, a side sill reinforcing member 37, and a side sill outer (not shown). The right center pillar 26 is mounted to the right side sill inner 36 and the side sill outer.

The first left cross member 14 is comprised of an inner cross member 41 linked at one end to the tunnel part 11a, and a left outer cross member 42 mounted at one end to the other end of the inner cross member 41 and linked at the other end to the left side sill inner 31 of the left side sill 12. A seat-mounting hole 41a is opened in the inclined surface of the inner cross member 41 near the tunnel part 11a, in order to mount the front ends of a pair of left and right rails 92, 92 (see FIG. 6) provided to the bottom of a seat 91 (see FIG. 6); i.e., in order to mount the front part of the seat 91. A seat-mounting hole 42a is opened in the inclined surface of the outer cross member 42.

Similarly, the first right cross member 16 is comprised of an inner cross member 43 and a right outer cross member 44. A seat-mounting hole (not shown) is opened in the inner cross member 43, and a seat-mounting hole 44a is opened in the outer cross member 44.

The second left cross member 17 is comprised of an inner cross member 46 linked at one end to the tunnel part 11a, and an outer cross member 47 mounted at one end to the other end of the inner cross member 46 and linked at the other end to the left side sill inner 31 of the left side sill 12. A seat-mounting hole 46a is opened in the top surface of the inner cross member 46 near the tunnel part 11a and a seat-mounting hole (not shown) is opened in the top surface of the outer cross member 47, in order to mount the rear ends of the pair of left and right rails 92, 92 provided to the bottom of the seat 91.

Similarly, the second cross member 18 is comprised of an inner cross member 48 and a right outer cross member 49, a seat-mounting hole (not shown) is opened in the inner cross member 48, and a seat-mounting hole 49a is opened in the right outer cross member 49.

On the internal side of the left side sill inner 31 and the side sill reinforcing member 32, bulk heads 51, 52 are mounted in front and behind of the center pillar 24 and on the sides of the first left cross member 14 and the middle floor cross member 21, respectively.

Providing bulk heads 51, 52 to the sides of the first left cross member 14 and the middle floor cross member 21 in this manner makes it possible for a load to be effectively transmitted from the left side sill 12 to the first left cross member 14 and the middle floor cross member 21 via the bulk heads 51, 52 when, e.g., a load is inputted from the side of the left center pillar 24.

Similarly, bulk heads (not shown) are provided to the internal side of the right side sill inner 36 and the side sill reinforcing member 37.

The centers of the first cross members 14, 16 are separated by gaps from the floor panel 11 and are disposed so as to not come in contact with the floor panel 11.

Figure 2:
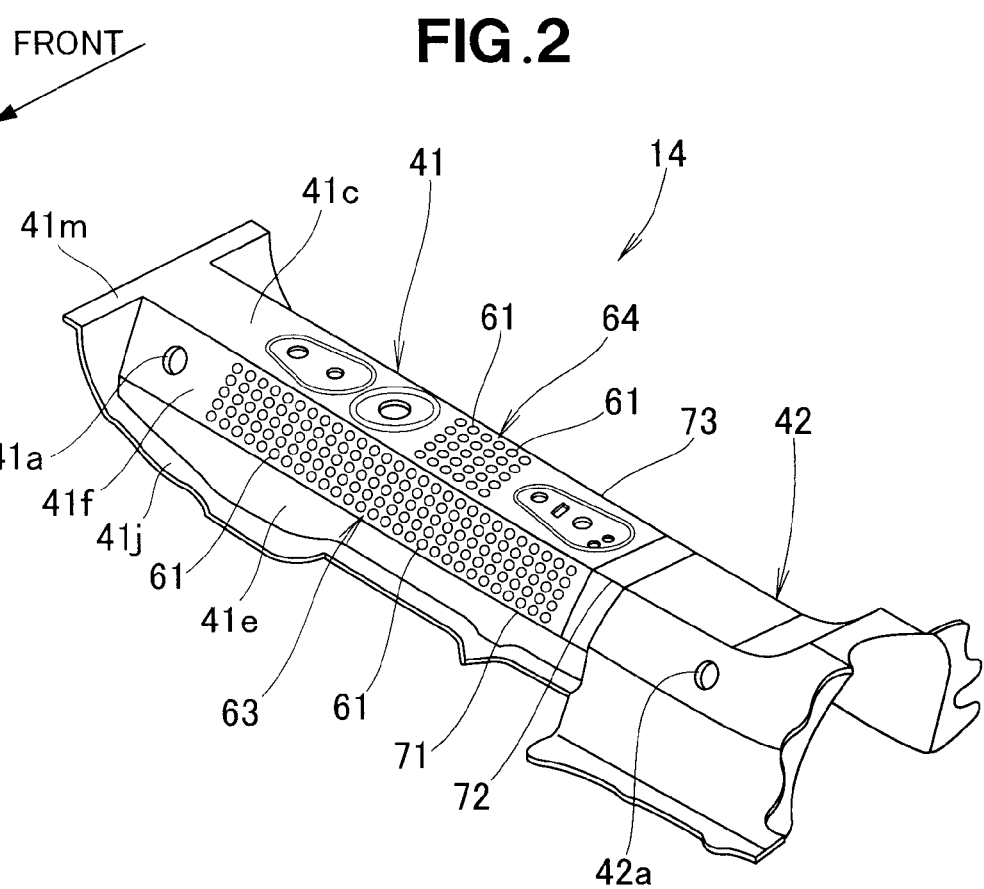
FIG. 2 is a perspective view showing a first cross member shown in FIG. 1.

The first left cross member 14 is comprised of the inner cross member 41 and the outer cross member 42, as shown in FIG. 2. The inner cross member 41 and the outer cross member 42 are both formed by being bent into polygonal shapes.

The inner cross member 41 is partially provided with hole clusters 63, 64 in which pluralities of tiny holes 61 for weight reduction are opened. One end of the first left cross member 14 is inclined upward and bonded to the side sill inner 31 so as to extend longitudinally of the vehicle body along the internal side of the side sill 31, as shown in FIG. 1.

Figure 3A:
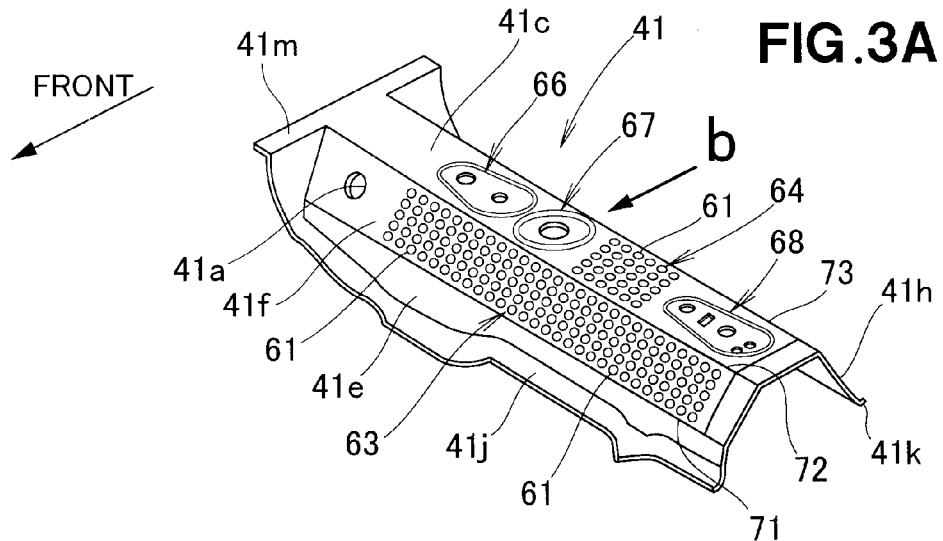
FIGS. 3A through 3C are perspective views of an inner cross member shown in FIG. 2.
Figure 3B:
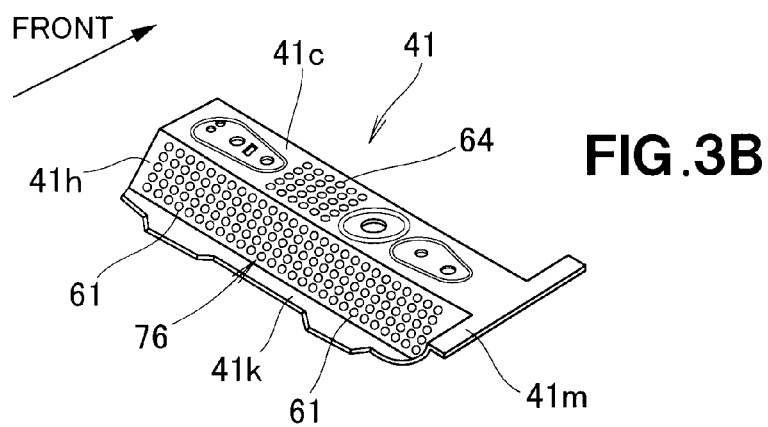
Figure 3C:
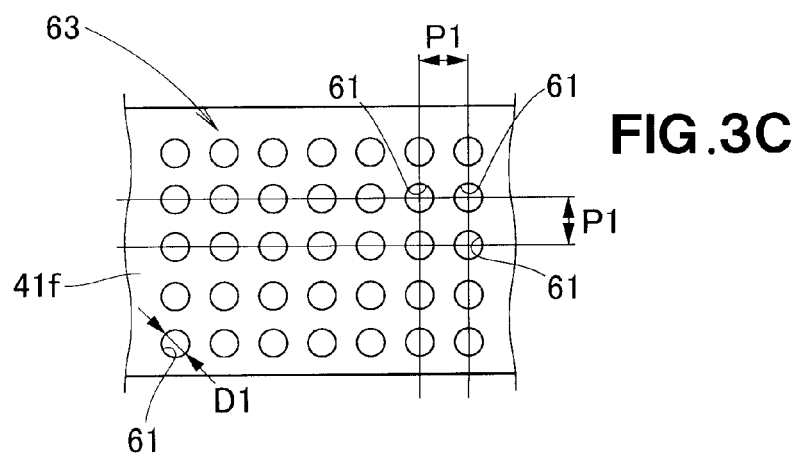

FIGS. 3A through 3C show the inner cross member 41 shown in FIG. 2.

In FIG. 3A, the inner cross member 41 is comprised of a front wall 41e, a front inclined wall 41f extending upward at a rearward incline integrally from the top edge of the front wall 41e, a top wall 41c extending rearward integrally from the rear edge of the front inclined wall 41f, a rear inclined wall 41h extending downward at a rearward incline integrally from the rear edge of the top wall 41c, a front flange 41j provided integrally to the bottom edge of the front wall 41e, and a rear flange 41k provided integrally to the bottom edge of the rear inclined wall 41h.

The front wall 41e is not provided with a hole cluster for weight reduction. In other words, a plurality of tiny holes 61 is not provided to the front wall 41e. The purpose of this is to ensure that during braking or a vehicle collision, for example, the front wall 41e and the peripheral edge of the seat-mounting hole 41a of the front inclined wall 41f will together bear a forward-directed load acting on the inner cross member 41 from the seat.

The front inclined wall 41f is provided with the seat-mounting hole 41a for mounting the seat; and the hole cluster 63 in which the tiny holes 61 are formed, the hole cluster 63 being provided to a position separated from the seat-mounting hole 41a, i.e., a position subject to a predetermined load when a predetermined load acts on the inner cross member 41 from the seat mounted using the seat-mounting hole 41a.

The top wall 41c is provided with mounting parts 66, 67, 68 for various components; the hole cluster 64; and a tunnel-bonding part 41m for bonding to the tunnel part 11a (FIG. 1) of the front floor panel 11 (FIG. 1), the tunnel-bonding part 41m being formed on the inside end of the inner cross member 41 so as to extend in the longitudinal direction of the vehicle body.

The numerical symbol 71 in the drawing denotes a ridge line between the front wall 41e and the front inclined wall 41f, 72 denotes a ridge line between the front inclined wall 41f and the top wall 41c, and 73 denotes a ridge line between the top wall 41c and the rear inclined wall 41h.

These ridge lines 71, 72, 73 are portions for improving the rigidity of the inner cross member 41, and the inner cross member 41 is ensured to be rigid due to the ridge lines 71 to 73, even though the hole cluster 63 is provided between the ridge lines 71, 72 and the hole cluster 64 is provided between the ridge lines 72, 73.

The rear inclined wall 41h is provided with a hole cluster 76 over substantially its entire surface as shown in FIG. 3B because the loads that act thereon are small. The amount by which the inner cross member 41 is reduced in weight can thereby be increased.

In FIGS. 3A and 3B, the tiny holes 61 are not opened in the mounting parts for adjacent components, the parts bonded by welding, or the ridge lines.

FIG. 3C shows the hole cluster 63, wherein the tiny holes 61 are opened in parallel in a grid. Denoting the inside diameters of the tiny holes 61 as D1 and the pitch of the tiny holes 61 as P1, D1=3 mm and P1=5 mm, for example. The tiny holes 61 are opened in the other hole clusters in the same manner as in the hole cluster 63.

Figure 4:
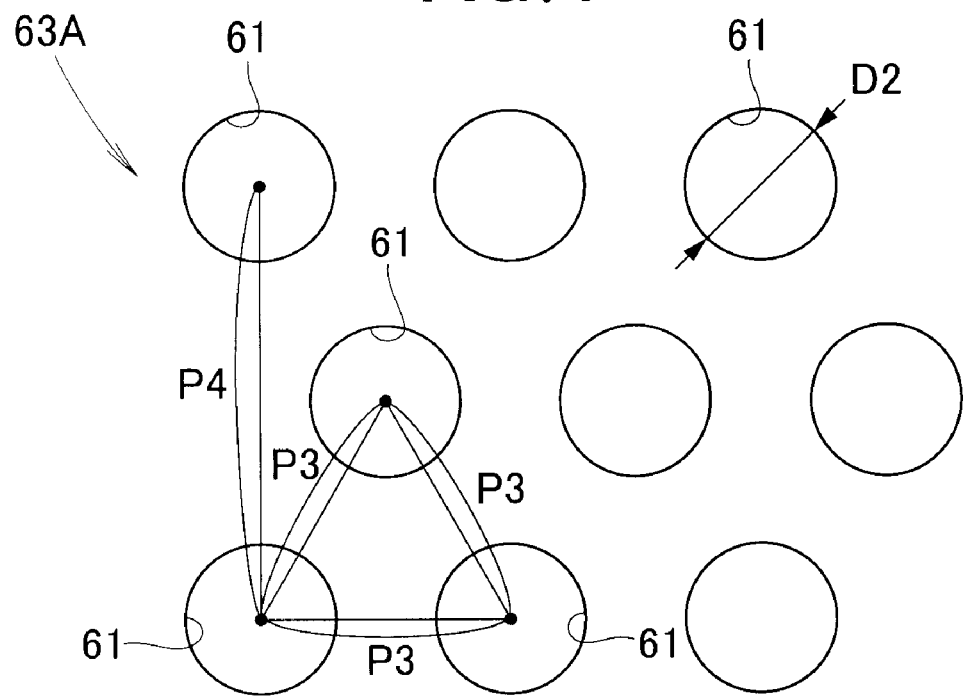
FIG. 4 is a schematic view showing another embodiment of an arrangement of tiny holes in the inner cross member of FIG. 3C.

FIG. 4 shows another embodiment of an arrangement of tiny holes in the inner cross member. In this hole cluster 63A, tiny holes 61 are opened in a staggered pattern. Specifically, a triangle connecting the centers of three tiny holes 61 is an equilateral triangle.

Denoting the inside diameters of the tiny holes 61 as D2, the distance between the centers of adjacent tiny holes 61 as P3, and the pitch between vertically aligned tiny holes 61 as P4; D2=3 mm, P3=5 mm, and P4=√3×P3, for example.

FIGS. 5A and 5B show the floor structure for a vehicle body shown in FIG. 1.

In FIG. 5A, the inside of the tunnel part 11a of the front floor panel 11 is provided with a tunnel-interior cross member 78 linking the left and right side walls 11g, 11h of the tunnel part 11a and extending in the vehicle width direction.

The tunnel-interior cross member 78 is comprised of a vertical wall 78a and a bottom wall 78b formed by bending integrally with the bottom of the vertical wall 78a, and the tunnel-interior cross member 78 has an upward-opening U shape in cross section. Reference numeral 81 denotes a reinforcing member for linking together the bottom surfaces of the left and right floor bodies 11b, 11c of the front floor panel 11.

The tunnel part 11a has ridges 11j, 11k formed horizontally in the respective vertical centers of the side walls 11g, 11h as shown in FIG. 5B, wherein tunnel-bonding parts 41m, 43m of the inner cross members 41, 43 are positioned in the top surfaces 11m, 11m of the ridges 11j, 11k; left and right tunnel-bonding parts 78e, 78f provided to the bottom wall 78b of the tunnel-interior cross member 78 are positioned on the bottom surfaces 11n, 11n of the ridges 11j, 11k; the tunnel-bonding part 41m, the ridge 11j, and the tunnel-bonding part 78e are spot-welded together; and the tunnel-bonding part 43m, the ridge 11k, and the tunnel-bonding part 78f are spot-welded together.

As a result, the top wall 41c of the inner cross member 41 and the top wall 43c of the inner cross member 43 are bonded linearly via the bottom wall 78b of the tunnel-interior cross member 78, as shown in FIG. 5A.

It is thereby possible for the inner cross member 41, the tunnel-interior cross member 78, and the inner cross member 43 to be linearly linked, increasing strength and rigidity against tensile force in the vehicle width direction; and to reduce vertical displacement of the front floor panel 11 when vertical vibration occurs in the front floor panel 11, for example.

Furthermore, the tunnel-bonding part 41m, the ridge 11j, and the tunnel-bonding part 78e are stacked in three layers, and the tunnel-bonding part 43m, the ridge 11k, and the tunnel-bonding part 78f are stacked in three layers, making it unlikely that bending will occur in the joined parts between the tunnel part and the cross members as in conventional practice.

Therefore, vertical vibration in the front floor panel 11 can be minimized, vibration is not readily transmitted to the seat mounted to the first cross members 14, 16 and the second cross members 17, 18 (FIG. 1), and the ride quality can be improved.

Figure 6:
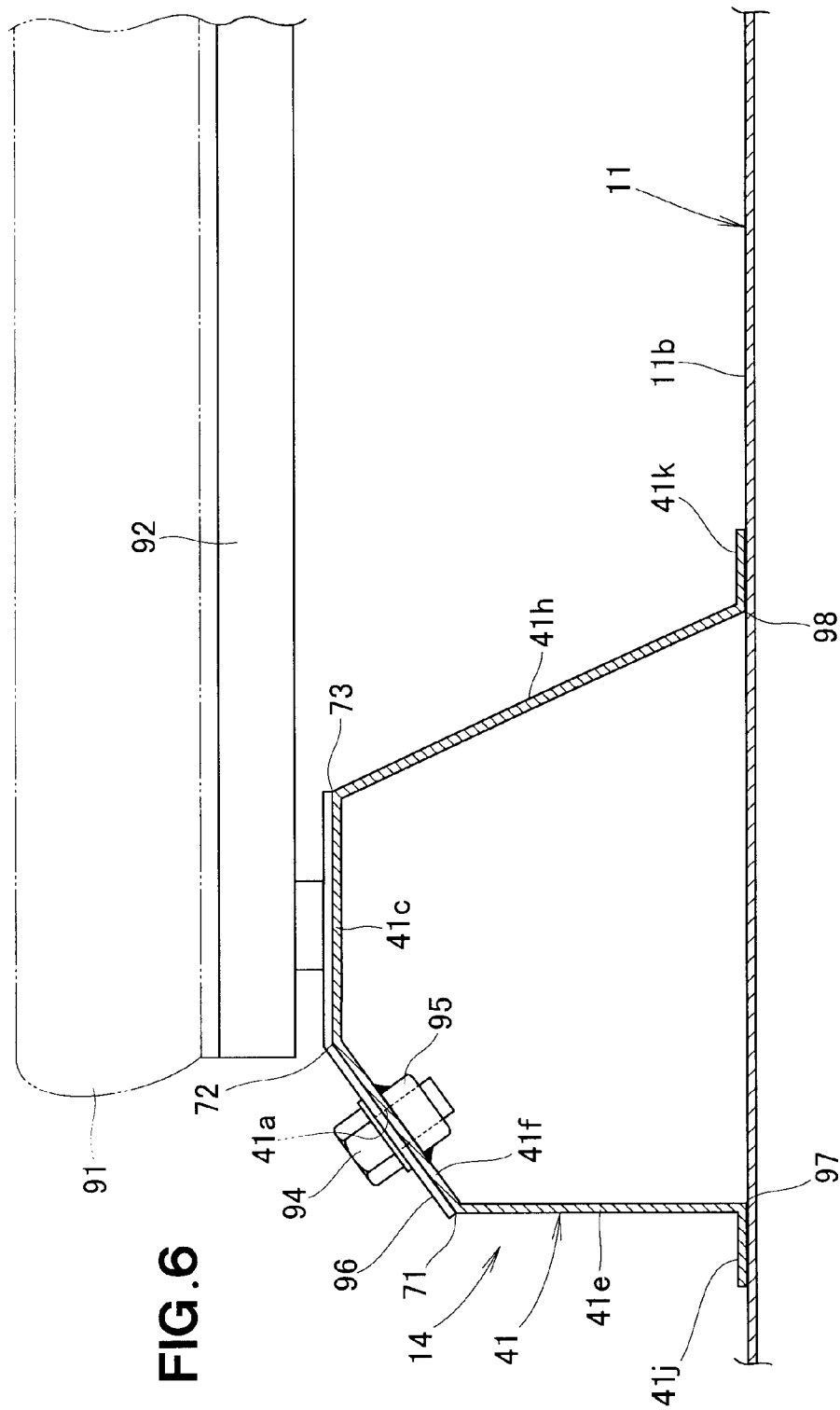
FIG. 6 is an enlarged cross-sectional view taken along line 6-6 of FIG. 1.

The inner cross member 41 of the first cross member 14 is comprised of the front wall 41e, the front inclined wall 41f extending upward at a rearward incline integrally from the top edge of the front wall 41e, the top wall 41c extending rearward integrally from the rear edge of the front inclined wall 41f, the rear inclined wall 41h extending downward at a rearward incline integrally from the rear edge of the top wall 41c, the front flange 41j provided integrally to the bottom edge of the front wall 41e, and the rear flange 41k provided integrally to the bottom edge of the rear inclined wall 41h, as shown in FIG. 6.

The front inclined wall 41f has the seat-mounting hole 41a through which a bolt 94 passes in order to mount the left and right rails 92, 92 (only one numerical symbol 92 is shown) of the seat, and a nut 95 through which the bolt 94 is threaded. The front flange 41j and the rear flange 41k are mounted to the front floor panel 11.

A mounting bracket 96 provided to the rails 92 is fastened to the front inclined wall 41f by the bolt 94. The reference numeral 97 denotes a ridge line between the front wall 41e and the front flange 41j, and 98 denotes a ridge line between the rear inclined wall 41h and the rear flange 41k.

Figure 7:
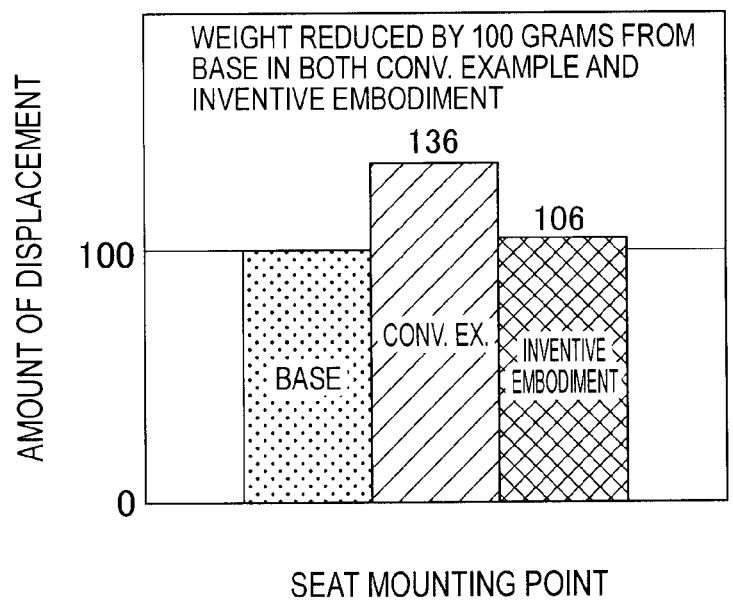
FIG. 7 is a graph showing the results of comparisons of rigidities of inner cross members in a conventional example and in the present embodiment.
Figure 8:
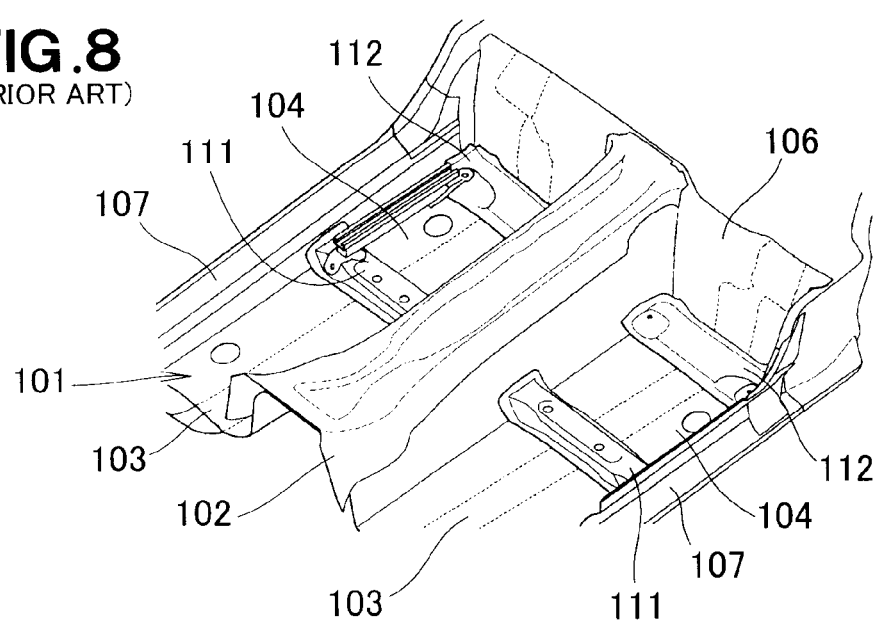
FIG. 8 is a perspective view of a conventional vehicle body floor structure.
Figure 9:
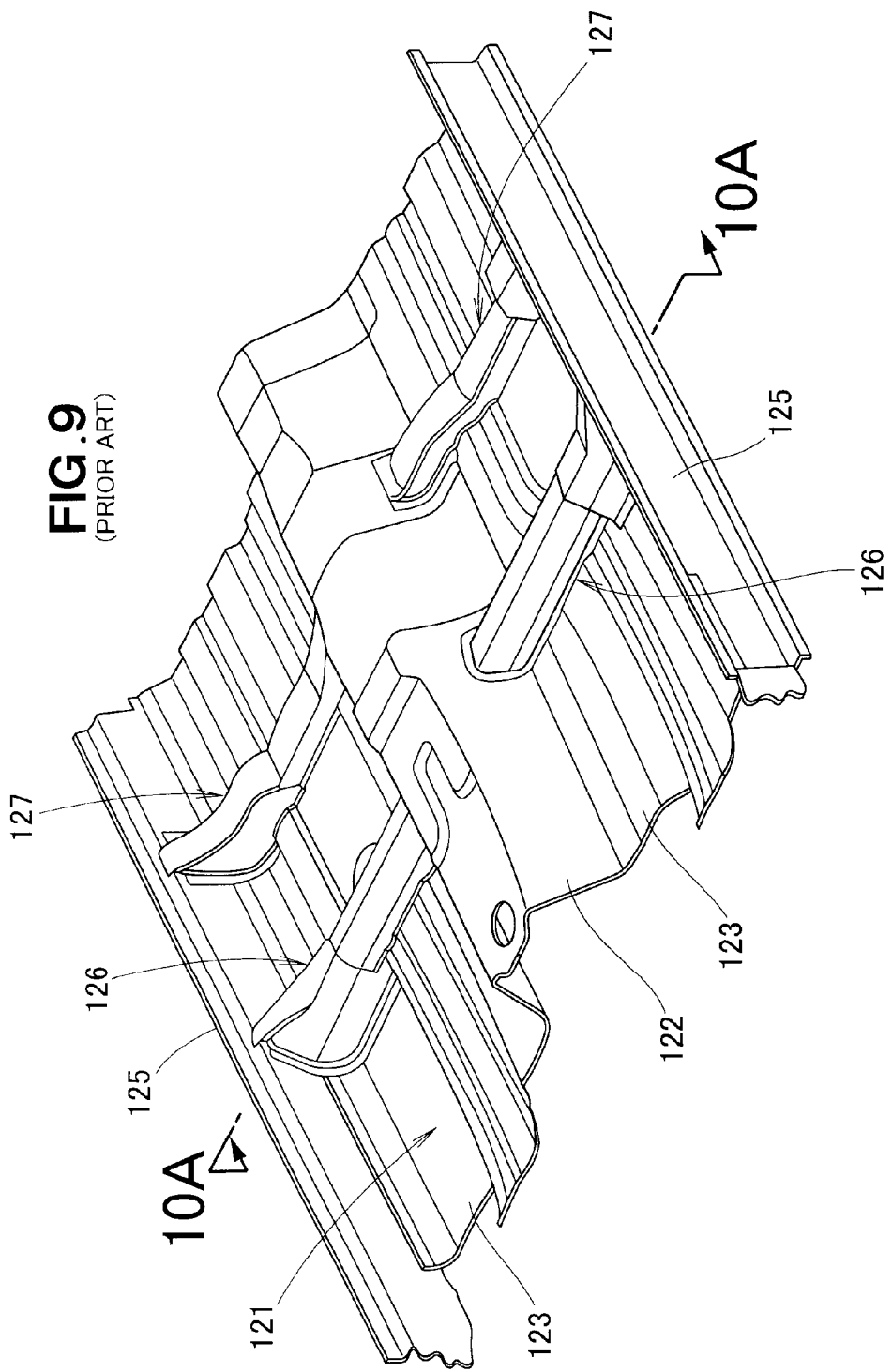
FIG. 9 is a perspective view showing a bonded relationship between a tunnel part and cross members of a floor panel of a separate conventional vehicle body floor structure similar to the one shown in FIG. 8.
Figure 10A:
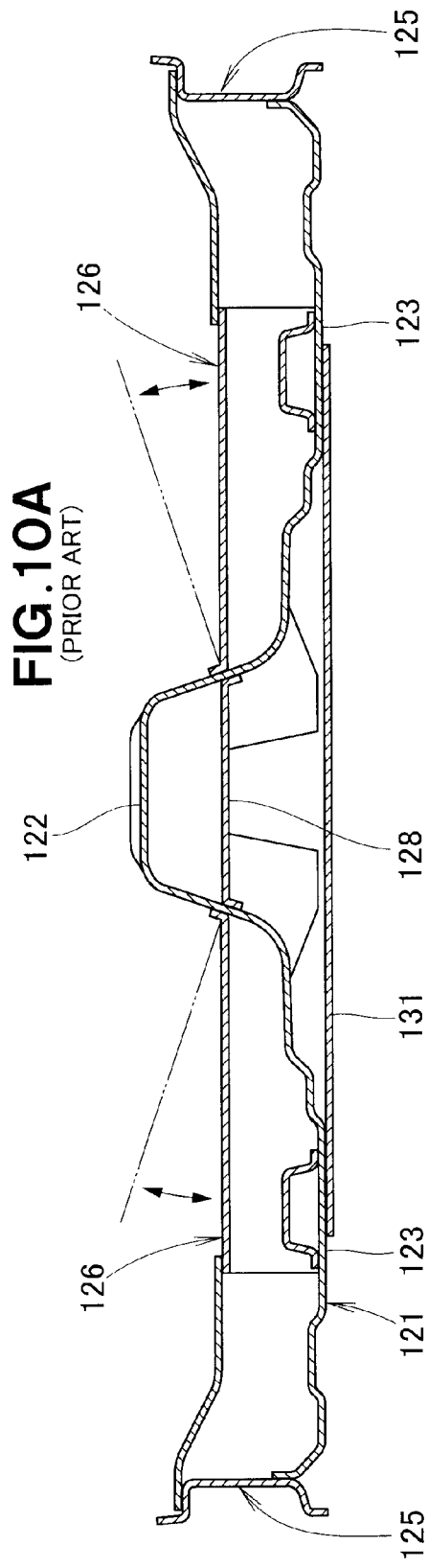
FIGS. 10A and 10B are cross-sectional views of the vehicle body floor structure of FIG. 9.
Figure 10B:
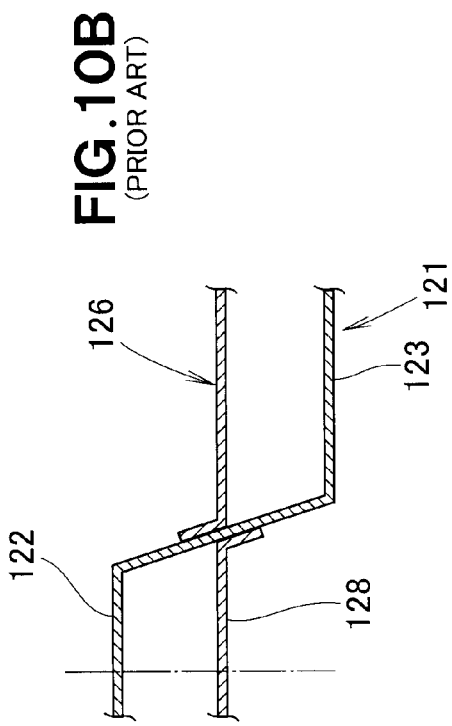

FIG. 7 is a graph comparing the rigidities of the inner cross members in a conventional example and in the present embodiment. This graph shows the amount of displacement measured at the seat-mounting point in the inner cross member (the position of the seat-mounting hole 41a shown in FIG. 6, or optionally the position of the bolt 94 or nut 95) when a forward-directed predetermined load is applied to the inner cross member from the direction of the seat. The vertical axis of the graph represents the amount of displacement at the mounting point, and the amount of displacement of a base material (an inner cross member 41 (see FIG. 3A) provided with no hole clusters) is represented as 100.

In the conventional example, the plate thickness of the base material is reduced to reduce weight, while in the embodiment, the inner cross member 41 of the present embodiment is used. In both the conventional example and the embodiment, the base material is reduced in weight by 100 grams.

In the graph, the conventional example exhibits a 36% increase in displacement from the base material, while the embodiment exhibits only a 6% increase in displacement from the base material.

Thus, in the present embodiment, although weight was reduced by the same amount as in the conventional example, displacement was less than in the conventional example, i.e., rigidity was successfully increased.

In a floor structure for a vehicle body in which the tunnel part 11a extending longitudinally is provided in the center of the front floor panel 11, the side sills 12, 13 extending longitudinally are mounted on the left and right ends of the front floor panel 11, and the tunnel part 11a and side sills 12, 13 are linked by the first cross members 14, 16 as cross members extending over the front floor panel 11 in the vehicle width direction as shown in FIGS. 1 and 5; the ridges 11j, 11k are formed on the tunnel part 11a, and the inner cross member 48 as a tunnel-interior cross member provided inside the tunnel part 11a and the first cross members 14, 16 on the front floor panel 11 are linearly bonded via the ridges 11j, 11k. Therefore, vertical displacement in the front floor panel 11 can be minimized, vertical vibration in the front floor panel 11 can be minimized, and the ride quality of the vehicle can be improved.

The first cross members 14, 16 are bent into polygonal shapes in cross section, and pluralities of small holes 61 functioning as weight-reducing holes for reducing weight are opened in the regions bordered by the ridge lines 71, 72, 73, 97, 98 formed in the first cross members 14, 16, as shown in FIG. 2. Therefore, the rigidity of the first cross members 14, 16 can be ensured by the ridge lines 71, 72, 73, 97, 98 while the first cross members 14, 16 are reduced in weight by the tiny holes 61.

The first cross members 14, 16 each have a front wall 41e and a front inclined wall 41f extending upward at a rearward incline from the top end of the front wall 41e, a seat-mounting hole 41a for mounting the seat is opened in the front inclined wall 41f, and tiny holes 61 are opened in the regions other than the periphery of the seat-mounting hole 41a, as shown in FIGS. 2 and 6. Therefore, forward-directed loads transmitted from the seat to the first cross members 14, 16 during breaking or during a vehicle collision can be borne by the front wall 41e and the periphery of the seat-mounting hole 41a in the front inclined wall 41f.

Obviously, various minor changes and modifications of the present invention are possible in light of the above teaching. It is therefore to be understood that within the scope of the appended claims the invention may be practice otherwise than as specifically described.

What is claimed is:

1. A floor structure for a vehicle body, comprising:
    a floor panel including a floor body and a tunnel part, the floor body defining a floor body plane and the tunnel part being provided laterally centrally of the vehicle body and extending longitudinally along the vehicle body, the tunnel part including a top wall and side walls, the side walls extending from the top wall toward the floor body plane;
    side sills mounted on respective left and right sides of the floor panel and extending longitudinally along the vehicle body;
    cross members extending over the floor panel laterally along the vehicle body and linking the tunnel part and the respective side sill, each of the cross members including
        a plurality of weight reduction holes for reducing weight, the plurality of weight reduction holes being provided in regions bordered by ridge lines so as to form hole clusters,
        a front wall that is free of the weight reduction holes,
        a front inclined wall extending upward at a rearward incline from a top edge of the front wall, the front inclined wall including a seat-mounting hole for mounting a seat, wherein the weight reduction holes forming the hole clusters are provided in regions other than a periphery of the seat-mounting hole,
        a top wall extending rearward from a rear edge of the front inclined wall, and
        a rear inclined wall extending downward at a rearward incline from a rear edge of the top wall; and
    a tunnel-interior cross member provided inside the tunnel part and extending between the side walls, wherein
    the side walls each including a horizontal ridge formed in respective vertical centers of the side walls for receipt of the tunnel-interior cross member and the respective cross members such that the tunnel-interior cross member is vertically spaced from the floor body plane.

2. The floor structure of claim 1, wherein each of the cross members has a region for mounting a front part of a seat.

3. The floor structure of claim 1, wherein the weight reduction holes are arranged in a staggered pattern.

4. The floor structure of claim 1, wherein the tunnel-interior cross member has an upward-opening U-shape in cross section.

5. The floor structure of claim 1, wherein each of the cross members has one end inclined upward, the one end being joined to a side sill inner provided in such a manner as to extend longitudinally of the vehicle body along the internal side of the side sill.

6. The floor structure for a vehicle body of claim 1, wherein each of the cross members has a gap formed between a center part thereof and the floor panel so that the center part and the floor panel are not joined together.

* * * * *